United States Patent
Kim et al.

(10) Patent No.: US 8,189,859 B2
(45) Date of Patent: May 29, 2012

(54) APPARATUS FOR INSERTING WATERMARK AND METHOD THEREFOR

(75) Inventors: Jongheum Kim, Seoul (KR); Jongan Kim, Seoul (KR)

(73) Assignee: KT Corporation, Bundang-Gu, Gyeonggi-Do, Seongnam (KR)

( * ) Notice: Subject to any disclaimer, the term of this patent is extended or adjusted under 35 U.S.C. 154(b) by 19 days.

(21) Appl. No.: 12/452,418

(22) PCT Filed: Dec. 1, 2009

(86) PCT No.: PCT/KR2009/007121
§ 371 (c)(1), (2), (4) Date: Aug. 20, 2010

(87) PCT Pub. No.: WO2010/064830
PCT Pub. Date: Jun. 10, 2010

(65) Prior Publication Data
US 2011/0188700 A1    Aug. 4, 2011

(30) Foreign Application Priority Data
Dec. 1, 2008    (KR) ........................ 10-2008-0120549

(51) Int. Cl.
G06K 9/00    (2006.01)
H04L 9/32    (2006.01)
(52) U.S. Cl. ........................ 382/100; 713/176
(58) Field of Classification Search .................. 382/100, 382/232, 240; 380/51, 54, 252, 287; 713/176, 713/179; 358/3.28; 283/72, 74–81, 85, 93; 348/461, 463
See application file for complete search history.

(56) References Cited

U.S. PATENT DOCUMENTS

| | | | | |
|---|---|---|---|---|
| 6,101,602 | A * | 8/2000 | Fridrich | 713/176 |
| 7,499,565 | B2 * | 3/2009 | Fujii et al. | 382/100 |
| 7,587,062 | B2 * | 9/2009 | Cornog et al. | 382/100 |
| 7,684,637 | B2 * | 3/2010 | Ishikawa et al. | 382/270 |
| 7,697,719 | B2 * | 4/2010 | Rhoads | 382/100 |

FOREIGN PATENT DOCUMENTS

| | | |
|---|---|---|
| KR | 1020010063410 | 7/2001 |
| KR | 1020020084588 | 11/2002 |
| KR | 1020030039705 | 5/2003 |
| KR | 1020040087759 | 10/2004 |

* cited by examiner

*Primary Examiner* — Abolfazl Tabatabai
(74) *Attorney, Agent, or Firm* — Lexyoume IP Group, PLLC.

(57) ABSTRACT

There are provided an apparatus for inserting a watermark and a method therefor. The apparatus for inserting a watermark includes a watermark pattern image receiving unit that stores a watermark pattern image including a preset bit value; a watermark information generation unit that stores watermark information including binary tracking information generated based on at least one of a user ID value and a terminal ID value; and a watermark insertion unit that receives watermark pattern images corresponding to bit values of the stored watermark information from the watermark pattern image generation unit, and overlays the watermark pattern images in sequence on a display screen.

17 Claims, 16 Drawing Sheets

FIG. 6
```
0011 0011 0011 0011  0011 0011 0011 0011  0011 0011 0011 0011
0101 0101 0101 0101  0101 0101 0101 0101···0101 0101 0101 0101
1011 0010 1000 0111  1011 0010 1000 0111  1011 0010 1000 0111
```
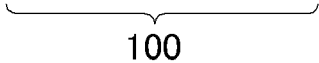     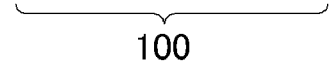     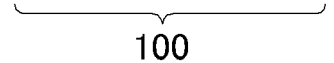
100       100       100

<WATERMARK INFORMATION BEFORE MODIFICATION>

<WATERMARK INFORMATION AFTER MODIFICATION>

APPARATUS FOR INSERTING WATERMARK AND METHOD THEREFOR

TECHNICAL FIELD

The present disclosure relates to an apparatus for inserting a watermark and a method therefor. More particularly, the present disclosure relates to an apparatus for inserting a watermark capable of matching partitioned tracking information with a location information value and using a watermark pattern image corresponding to the matched information and a method therefor.

BACKGROUND ART

Recently, as an Internet protocol television (IPTV) industry has been expanded, a technique of inserting and extracting information for tracking pirates, who make duplicate copies illegally, from a terminal in real time has been drawing great attention. That is because that an analog display and a digital display coexist in the present service environment and because that in case of transferring image data through an analog interface, there is no definite secure transmission standard. Actually, when video data is transferred through an analog interface, it is possible to capture standard grade images. Recently, an apparatus for capturing such images is cheap enough for anyone to buy one. Accordingly, there has been used various watermarking techniques for tracking an illegal distribution of contents. Generally, if the inserted tracking information is found by a user when image data is reproduced, it may arouse the user's antipathy. Therefore, as a watermarking technique for tracking pirates, there has been mainly used a method of processing data and inserting it into a specific portion of video data so as not to stand out. In particular, a watermarking method of inserting tracking information in an invisible form into image data requires a complex operation depending on an algorithm by image frame.

A set-top box is a dedicated device that turns an external input signal into content to be outputted through a display device. For example, an IP set-top box is a dedicated device that turns various kinds of image signals transmitted through an Internet protocol into contents to be outputted through a TV monitor for offering an IPTV service. In the IP set-top box, image processes, such as parsing, decoding, mixing and output, of image signals of contents and an EPG (Electronic Program Guide) image are implemented in hardware and applications are driven by using a predetermined CPU.

However, since the IP set-top box has limited function, it is difficult to perform various operations. Particularly, without using a dedicated SoC (System on a Chip) including a watermarking algorithm, it is difficult to perform a complex operation related to a watermarking technique.

Further, as a method of inserting tracking information into video data, there is a method of overlaying images containing the tracking information with decoded image information before being outputted through a TV monitor. Since the overlay is implemented in hardware such as a decoder, if such a method is used, a watermarking function can be effectively implemented with little need of operations in a CPU. However, in this case, the image containing the tracking information is directly exposed to a user, and thus, it may be vulnerable to various attacks such as rotation, translation, cropping, scaling, frame rate conversion, and resolution conversion.

Further, in case of detecting tracking information from illegally distributed contents, if there is any error in the detected tracking information, the whole tracking information should be detected again. Therefore, it has taken a lot of time to detect the tracking information.

As one of prior arts, there has been disclosed Korean Patent No. 10-0405827 entitled "Method of inserting/extracting digital watermarks and apparatus for using thereof."

This prior art relates to a watermarking technique in which image data such as a logo and a picture is inserted into an video data as a watermark, and a watermark contained in the video data is extracted so as to be identified visually. Further, this prior art discloses a method of preventing a duplicate insertion of a watermark by measuring a correlation between the digital watermark inserted into the video data and the generated digital watermark.

However, in accordance with this prior art, the apparatus of inserting a watermark is required to excessively perform operations, and, thus, it is not suitable for an apparatus with low specifications. Further, if there is any error in watermarked information, the whole information should be detected again, and, thus, detecting tracking information is not effective.

DISCLOSURE OF THE INVENTION

Problems to be Solved by the Invention

In accordance with an embodiment of the present invention, there are provided an apparatus for inserting watermark information into video data by using a watermark pattern image in order for a user terminal to perform watermarking with a minimum resource and a method therefor.

Further, in accordance with an embodiment of the present invention, there are provided an apparatus for effectively detecting tracking information and inserting a watermark invulnerable to various attacks and a method therefor.

Means for Solving the Problems

The present disclosure provides an apparatus for inserting a watermark includes a watermark pattern image receiving unit that stores a watermark pattern image corresponding to a preset binary value; a watermark information generation unit that stores watermark information including binary tracking information generated based on at least one of a user ID value and a terminal ID value; and a watermark insertion unit that receives watermark pattern images corresponding to bit values of the stored watermark information from the watermark pattern image generation unit, and overlays the watermark pattern images in sequence on a display screen.

Further, the present disclosure provides a method of inserting a watermark includes receiving a watermark pattern image corresponding to a predetermined binary value; generating watermark information including binary tracking information with respect to a user reproducing video data; receiving watermark pattern images each corresponding to a bit value of the generated watermark information based on the generated watermark information; and overlaying the received watermark pattern images in sequence with frames of the video data.

Furthermore, the present disclosure provides a system for detecting watermarked tracking information includes an insertion information extraction unit that generates watermark information by extracting bit information of each frame including a bit value of tracking information and a location information value corresponding to the bit value of the tracking information, from a watermark pattern image overlaid with each frame of video data, and by arranging the extracted bit information of each frame; a tracking information detection unit that detects the tracking information from a repeated specific sequence of bits based on the generated watermark information and the location information; and a tracking information analysis unit that identifies an illegal distribution of content based on the detected tracking information. The tracking information includes information for identifying a user terminal reproducing the video data.

Moreover, the present disclosure provides an apparatus for inserting a watermark includes a watermark information generation unit that generates a watermark information including binary tracking information based on at least one of user ID value and a terminal ID value; a frame extraction unit that receives video data from a server and extracts video frames from the received video data; and a watermark information insertion unit that inserts the generated watermark information in sequence into the extracted video frames.

Effect of the Invention

In view of the foregoing, in a watermarking apparatus, it is possible to perform watermarking of tracking information into video data with a minimum operation by overlaying a watermark pattern image received from the outside with the video data.

Further, in view of the foregoing, by repeatedly and sequentially inserting a watermark pattern image containing a location information value into video data, invulnerability of the watermarked video data can be enhanced.

Furthermore, in view of the foregoing, watermark information which includes partitioned tracking information is generated, and, thus, even if any error is detected from the partitioned tracking information during detection of tracking information, it is possible to effectively detect whole tracking information.

Moreover, in view of the foregoing, it is possible to effectively extract inserted tracking information from illegally distributed video data.

BRIEF DESCRIPTION OF THE DRAWINGS

FIGS. 5 and 6 provide examples of third tracking information matched with a location information value in accordance with an embodiment of the present invention;

FIGS. 11 and 12 show watermark information before and after modification in accordance with an embodiment of the present invention;

FIGS. 13 to 15 show a procedure of detecting second tracking information in accordance with an embodiment of the present invention.

BEST MODE FOR CARRYING OUT THE INVENTION

Figure 1:
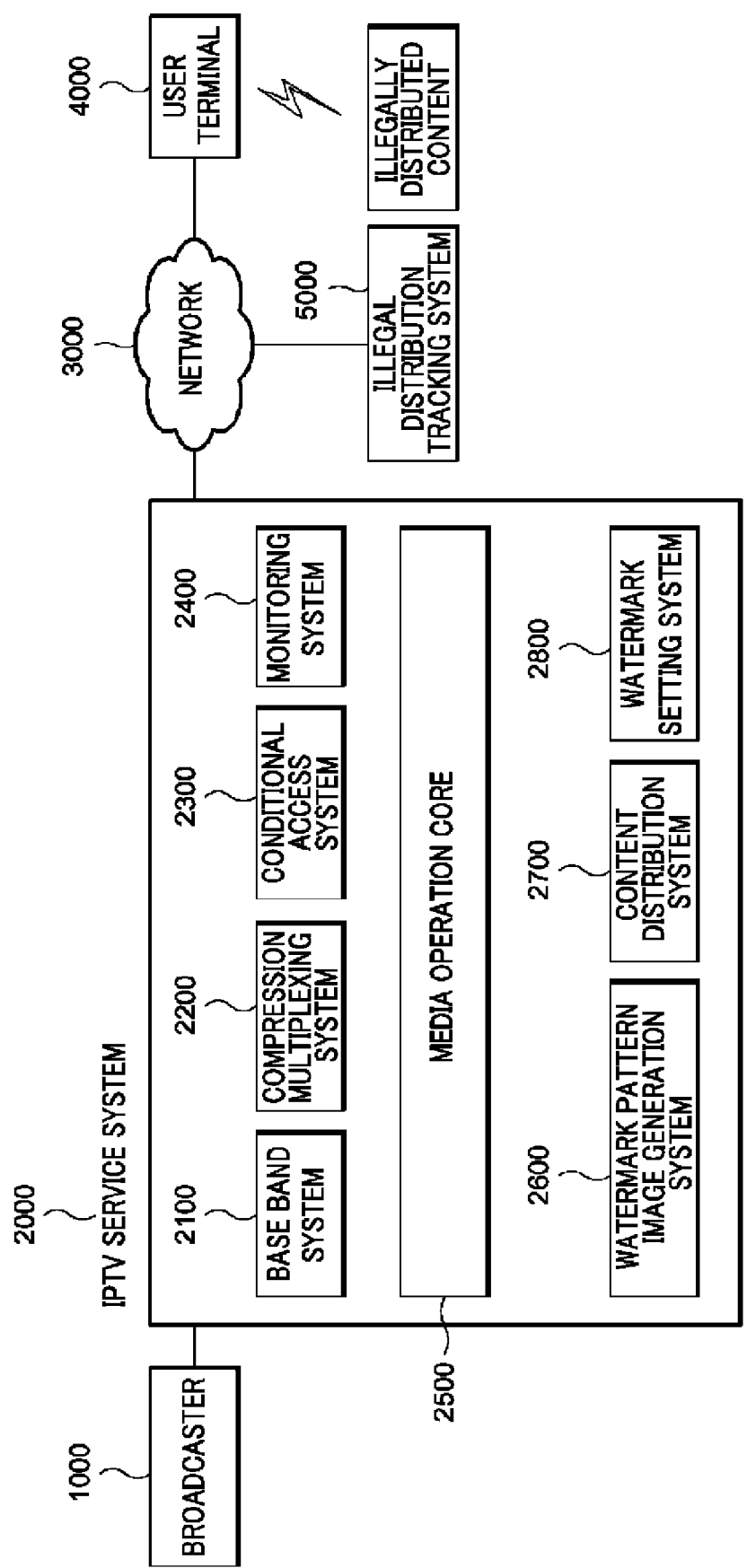
FIG. 1 is a detailed configuration view of a watermarking system in accordance with an embodiment of the present invention.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

In the present disclosure, "first tracking information" represents binary information required for tracking an illegal distribution of contents. The first tracking information may include such as ID (Identification) information of an IPTV (Internet Protocol Television) subscriber, hardware information of a user terminal, time for reproducing contents, or transaction information with which the IPTV subscriber can be identified. Further, the first tracking information may be partitioned.

"Second tracking information" represents information in which a sync code is inserted into the partitioned first tracking information, and may further include an error correction code or the like.

Further, "third tracking information" represents information in which one or more bit values of the second tracking information are matched with location information. The location information value is a binary value for identifying a location in the tracking information corresponding to each bit value of the tracking information.

Furthermore, "watermark information" represents information inserted into a video. The watermark information may be any one of the first tracking information, the second tracking information, and the third tracking information.

Hereinafter, the present invention will be explained in detail with reference to the accompanying drawings.

FIG. 1 is a detailed configuration view of a watermarking system in accordance with an embodiment of the present invention.

As depicted in FIG. 1, a watermarking system in accordance with an embodiment of the present invention includes a broadcaster 1000, an IPTV service system 2000, a network 3000, a user terminal 4000, and an illegal distribution tracking system 5000.

Further, the IPTV service system 2000 includes a base band system 2100, a compression multiplexing system 2200, a conditional access system (CAS) 2300, a monitoring system 2400, a media operation core (MOC) 2500, a watermark pattern image generation system 2600, a content distribution system 2700, and a watermark setting system 2800.

The broadcaster 1000 is configured to serve to produce, edit and modify broadcasting contents and offer them to the IPTV service system 2000. The broadcaster 1000 may include a program provider (PP) and a terrestrial broadcaster or contents provider (CP). Further, the broadcasting contents offered by the broadcaster 1000 can include various kinds of contents on the Internet.

The IPTV service system 2000 is configured to manage the contents received from the broadcaster 1000 and distribute the contents to the user terminal 4000 to offer broadcasting, recording, and reproducing services. The received broadcasting contents may include its relevant information and an electronic program guide (EPG) for such relevant information.

The IPTV service system 2000 may transmit video and audio signals, data for data broadcasting, and EPG information (PSIP/PSI/SI information) including a recommended program menu to IP set-top boxes of multiple subscribers in a multicasting method through a subscriber concentrator and a subscriber switch via a router supporting a multicast routing protocol.

The base band system 2100 may receive an MPEG2 (Moving Picture Experts Group 2) signal from an external program provider (PP) or an analog signal from a terrestrial broadcaster, may convert the received source signal into an SDI (Serial Digital Interface) signal, may synchronize frames, distribute video and audio signals of multiple channels (for example, 100 channels) through a routine switcher, may insert at least any one of an advertisement, a logo, and subtitles into the video and audio signals by using a character generator (CG) and an automatic program controller (APG) (i.e., edit and process the signals), and may transmit them to the compression multiplexing system 2200.

The SDI signal may be a digital standard signal having a transfer rate of, e.g., about 270 Mbps and may be a mixture of a complex digital video signal and a four channel digital audio signal.

The base band system 2100 may include a program provider (PP), a receiver receiving each broadcasting signal from a terrestrial broadcaster, a frame synchronizer for converting and modifying a source signal received by the receiver into an SDI signal and synchronizing frames, a signal distributor such as an A/V router connecting/concentrating broadcasting channels for operation management, and a character generator editing and processing the SDI signal by inserting an advertisement, a logo, and subtitles thereinto.

The compression multiplexing system 2200 can input the broadcasting video and audio signals received from the base band system 2100 to audio and video encoders, respectively, can generate an MPEG-2 TS (Transport Stream) signal by compressing the SDI video signal into H.264 and compressing the audio signal into MPEG-2 ACC. Also, the compression multiplexing system 2200 can multiplex the compressed broadcasting video and audio, the MPEG-2 TS signal, with data for data broadcasting and EPG information (PSIP/PSI/SI information) generated by a data encoder and a PSI/SI generator. Further, the compression multiplexing system 2200 can input the multiplexed MPEG-2 TS signal to a scrambler so as to be encoded in case of using a conditional access technique, can packetize it into IP packets, and can transmit a TS broadcasting signal.

Further, it is optional to use the conditional access system 2300 for preventing illegal viewing and illegal copy of recommended program contents.

The conditional access system 2300 is configured to encode a real-time channel and encode VOD contents, and control viewing authorities of users in order to allow only authorized users to use the channel and the contents. In order to prevent illegal copy of IPTV contents, it may be possible to use a digital rights management (DRM) system instead of the conditional access system 2300.

The monitoring system 2400 is configured to serve as a control system, and monitor transmission failure of an A/V broadcasting signal for IPTV service and downlink of the IPTV service system 2000 to check reception failure and subtitles.

The media operation core 2500 is a system for managing various kinds of business process information (for example, programming information, material information, contract information, and product information) for IPTV service. The media operation core 2500 may manage information flow in close relationship with respective systems.

The media operation core 2500 may manage broadcasting programming information, contents and media operation information, information of contracts with a program provider (PP) and a contents provider (CP), and product information. Further, the media operation core 2500 may serve as a coordinator managing information flow in close relationship with respective systems.

Further, the media operation core 2500 may manage contracts and media and contents meta data, and may acquire and manage broadcasting schedule information such as EPG information, in the aspect of acquisition; may manage programming of real-time broadcasting and VOD channels and may carry out agent management of an interlock with respective sub-systems, and may manage production of VOD catalog and various kinds of products, in the aspect of operation; may make settlements with CP/CA and a marketing analysis report on subscribers' propensity to view, in the aspect of analysis; and may monitor broadcasting transmission, may manage transmission of a video server and authorization of a VOD subscriber, may record and manage results of transmission for making settlements with the CP/CA, and may synchronize data with data of the respective interlocked subsystems, in the aspect of delivery.

The watermark pattern image generation system 2600 may be configured to generate a watermark pattern image by inserting bit information into an original image and provide the generated watermark pattern image to the user terminal 4000. Therefore, the user terminal 4000 may not be required to generate a watermark pattern image by itself and may perform watermarking of tracking information into video data with a minimum operation.

The watermark pattern image may be a watermark image into which information value to be watermarked is inserted. The watermark pattern image has as many patterns as the number of kinds of the information value to be inserted into an image. For example, if the information value to be inserted into the original image has a 2-bit binary value, the watermark pattern image may become four images which correspond to 00, 01, 10, and 11, respectively. Further, for example, if the information value to be inserted into the original image has a 3-bit binary value, the watermark pattern image may become eight images which correspond to 000, 001, 010, 011, 100, 101, 110, and 111, respectively. The watermark pattern image may be generated to be distinguishable from first tracking information, sync code, and the like by using various original images. In this case, when watermark information is detected, properties of a bit value in the detected watermark information can be checked by the detected watermark pattern image itself.

The watermark pattern image generation system 2600 may generate the watermark pattern image by using a logo image or a character image indicating a content rating or a company name as an original image. In case of generating the watermark pattern image by using the logo image or the character image, it is difficult to visibly distinguish whether or not information values are inserted into the original image. Therefore, coded tracking information can be watermarked invisibly.

Further, the watermark pattern image generation system 2600 may insert binary information values into a logo image by modifying color information values (for example, luminance) of pixels in the original logo image. In this case the color information of a region of interest (ROI), where a watermark is wanted to be inserted, can be modified. For example, in order to represent information value "1", color information values of the pixels within the region of interest (ROI) of the logo image can be averagely high as compared to the original image, and in order to represent information value "0", color information values of the pixels within the region of interest (ROI) of the logo image can be averagely low as compared to the original image. Furthermore, the watermark pattern image generation system 2600 may generate a watermark pattern image corresponding to a sync code and a watermark pattern image corresponding to a bit value of partitioned tracking information so as to be easily distinguished from each other.

The watermark pattern image may be provided to the user terminal 4000, and the watermark pattern image may be provided in sequence to a watermark insertion unit 4400 to be described later based on watermark information in the user terminal 4000. The watermark information is information generated by a watermark information generation unit 4300 to be described later, and may overlaid with a video frame. The watermark information may be any one of the first tracking information, the second tracking information, and the third tracking information. For example, if watermark information values are 00, 11, 01, and 10, watermark pattern images, which corresponding to 00, 11, 01, and 10, respectively, are called and overlaid in sequence with video frames at the user terminal 4000.

Moreover, the watermark pattern image generation system 2600 may be positioned at the user terminal 4000. In this case, the watermark pattern image generation system 2600 can receive an original image from a server and generate a watermark pattern image by using the received original image.

The content distribution system 2700 offers contents to the user terminal 4000.

The watermark setting system 2800 is configured to set rules relevant to watermarking such as a method of generating watermark information and a method of overlaying a watermark image. The watermark setting system 2800 may set the amount of information to be corresponded to the watermark pattern image, the size of a message block, and the number of repetition of each bit value. The watermark setting system 2800 may also set an exposure cycle of the watermark image, a starting time, and the number of repetition with respect to the overlay of the watermark image. The message block is a block of bit values including the partitioned tracking information, and may further include an error correction code.

Further, the watermark setting system 2800 may match each bit value of the first or second tracking information to be inserted into a video with location information. And the watermark setting system 2800 may decide to overlay a block of the bit value of the tracking information and the matched location information value with a video frame. The watermark setting system 2800 can offer the set rules to the watermark pattern image generation system 2600 and the user terminal 4000, and flexibly adjust generation and exposure of the watermark image.

The network 3000 is configured to receive contents from the IPTV service system 2000 and deliver the received contents to the user terminal 4000. The network 3000 may include a backbone network and an access network. The access network may be comprised of any one topology of Ethernet, xDSL (ADSL, VDSL) network, HFC (Hybrid Fiber Coaxial Ca) network, FTTC (Fiber To The Curb) network, and FTTH (Fiber To The Home) network.

The user terminal 4000 is configured to receive video data and pattern images from the IPTV service system 2000 and insert watermark information into the received video data by using the pattern images. The user terminal 4000 may be a device for using an Internet broadcasting service and generally includes an IPTV, a set-top box (STB), and a remote control. The IPTV outputs the contents received from the IPTV service system 2000 and delivers a response signal of the user inputted through the remote control to the IPTV service system 2000 through a return channel of the set-top box. The user terminal 4000 may be any one of terminals including a TV with a built-in IP STB, an IP STB connected with the user's TV, computer or notebook computer, and a personal digital assistant. A detailed configuration of the user terminal 4000 will be described later.

The illegal distribution tracking system 5000 is configured to extract tracking information from illegally distributed video data and may track a flow of the illegal distribution. The illegal distribution tracking system 5000 may extract watermarked information from the illegally distributed video data and may finally extract tracking information (first tracking information) by using location information, a sync code, an error correction code, and the like included in the extracted information. A detailed configuration of the illegal distribution tracking system 5000 will be described later.

Hereinafter, a detailed configuration of the user terminal 4000 in accordance with an embodiment of the present invention will be described with reference to FIG. 2.

Figure 2:
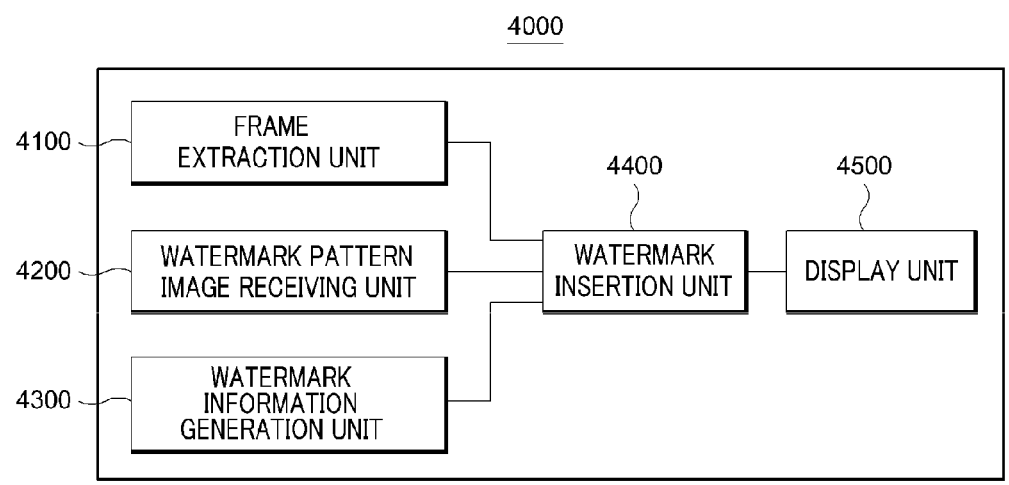
FIG. 2 is a detailed configuration view of a user terminal in accordance with an embodiment of the present invention.

FIG. 2 is a detailed configuration view of a user terminal 4000 in accordance with an embodiment of the present invention.

As depicted in FIG. 2, the user terminal 4000 in accordance with an embodiment of the present invention includes a frame extraction unit 4100, a watermark pattern image receiving unit 4200, a watermark information generation unit 4300, a watermark insertion unit 4400, and a display unit 4500.

The frame extraction unit 4100 receives video data and extracts video frames by decompressing a stream of the received video data.

The watermark pattern image receiving unit 4200 is configured to receive a watermark pattern image from the watermark pattern image generation system 2600 and offer the received watermark pattern image to the watermark insertion unit 4400.

The watermark information generation unit 4300 is configured to generate watermark information including tracking information and provide the generated watermark information to the watermark insertion unit 4400. A detailed configuration of the watermark information generation unit 4300 will be described later.

The watermark insertion unit 4400 is configured to call watermark pattern images in sequence based on the watermark information and insert the called watermark pattern images into each frame of the video data. For example, if watermark information values are 00, 11, 01, and 10, watermark pattern images, which corresponds to 00, 11, 01, and 10, respectively, may be called and overlaid in sequence with video frames. Further, if watermark information values are 001, 010, 101, and 111, watermark pattern images, which corresponds to 001, 010, 101, and 111, respectively, may be called and overlaid in sequence with video frames.

The watermark insertion unit 4400 may receive set values (for example, an exposure cycle of a watermark image and a starting time) relevant to the overlay of a watermark image from the watermark setting system 2800 and may overlay the watermark pattern image with the video frame based on the received set values.

The display unit 4500 is configured to display video data into which the watermark pattern image is inserted.

The user terminal 4000 may perform watermarking by using the watermark pattern image received from the IPTV service system 2000, and, thus, it is possible to effectively perform watermarking of tracking information into the video data.

Hereinafter, a detailed configuration of the watermark information generation unit 4300 in accordance with an embodiment of the present invention will be described with reference to FIG. 3.

Figure 3:
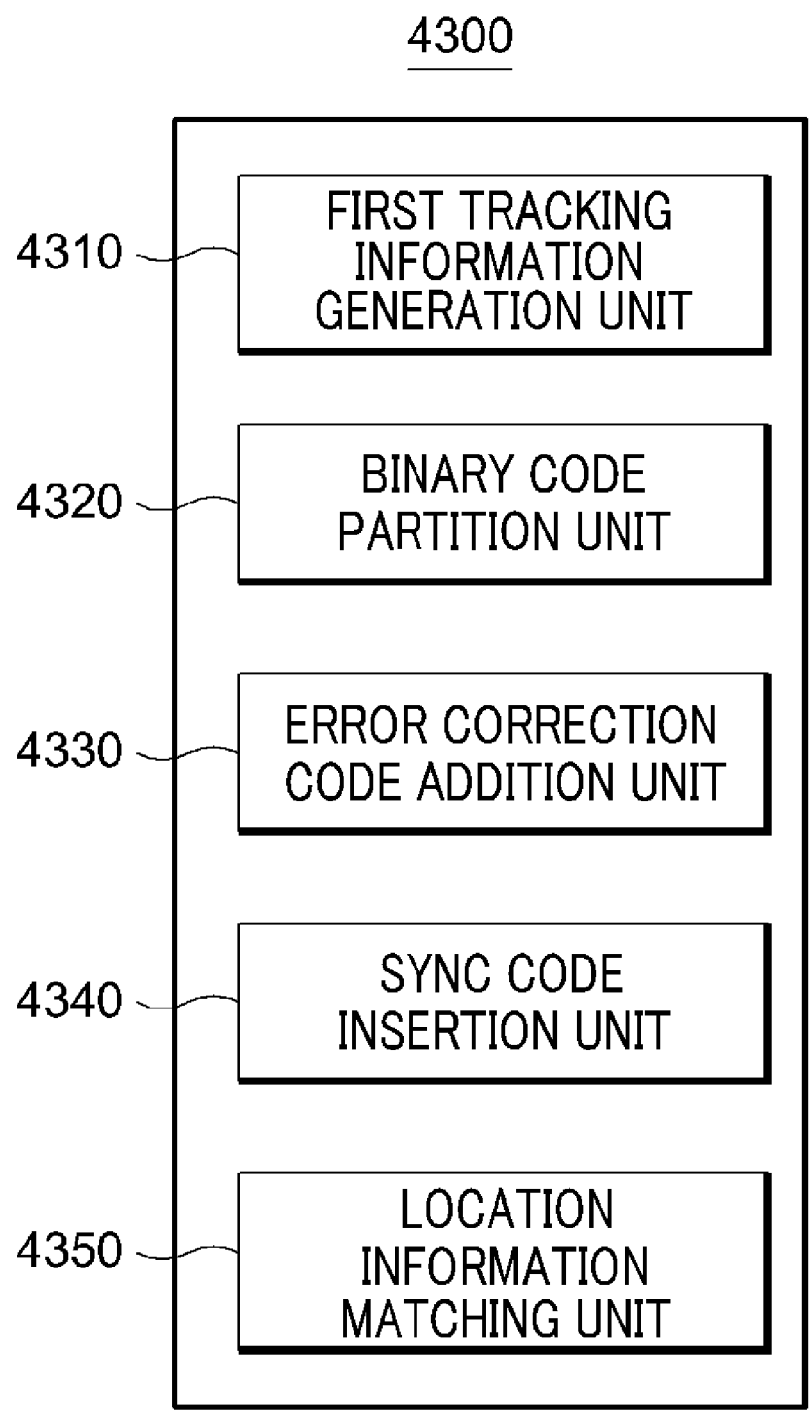
FIG. 3 is a detailed configuration view of a watermark information generation unit in accordance with an embodiment of the present invention.

FIG. 3 is a detailed configuration view of a watermark information generation unit 4300 in accordance with an embodiment of the present invention.

As depicted in FIG. 3, the watermark information generation unit 4300 in accordance with an embodiment of the present invention includes a first tracking information generation unit 4310, a binary code partition unit 4320, an error correction code (ECC) addition unit 4330, a sync code insertion unit 4340, and a location information matching unit 4450.

The first tracking information generation unit 4310 is configured to generate first tracking information in a binary form to be used in tracking an illegal distribution of contents. The first tracking information is binary information required for tracking the illegal distribution of the contents and may include, for example, ID (Identification) information of an IPTV (Internet Protocol Television) subscriber, hardware information of a user terminal, time for reproducing contents, transaction information with which the IPTV subscriber can be identified, or an ECC.

The binary code partition unit 4320 is configured to receive information about partition of the first tracking information from the watermark setting system 2800, and partition the first tracking information based on the received information.

The error correction code addition unit 4330 is configured to generate multiple number of message blocks by adding an error correction code to the partitioned first tracking information. The message block may be a sequence of bits in which the error correction code is added to the partitioned first tracking information.

In the embodiment of the present invention, it has been explained that the error correction code is included in second tracking information by being added to the first tracking information. However, the present invention is not limited to this embodiment. The error correction code may be included in the first tracking information instead of the second tracking information.

The sync code insertion unit 4340 is configured to generate the second tracking information by inserting a sync code into the partitioned first tracking information. The sync code insertion unit 4340 may insert the sync code between the message blocks in order to distinguish the message blocks. A sync code value represents a group number of a message block to be arranged after the sync code. The sync code is used to distinguish the message blocks. Further, the group number can be used to combine the message blocks.

The location information matching unit 4350 is configured to generate third tracking information by matching each bit value of the second tracking information with a location information value. The location information value can be used to identify a location in the second tracking information corresponding to each bit value of the second tracking information.

The location information matching unit 4350 may determine a range of a location information value and match a location information value in the determined range with each bit value of the second tracking information. The range of the location information value is a range of values the location information can have. For example, the location information value is in the range of 0 to 3, the location information may have values of 00, 01, 10, and 11. A location information matching unit 4350 may determine a range of the location information value depending on a basic image and specifications of a user terminal. Further, the location information value may be set in the range of 0 to 1, and in this case, a 1-bit value can be used as the location information value.

Furthermore, if the range of the location information value is smaller than the total number of bits of the second tracking information, the location information matching unit 4350 repeatedly matches the location information value with a bit value of the second tracking information.

For example, if the second tracking information has a 16-bit value, sixteen location information values are required to be matched with each bit value of the second tracking information and the location information matching unit 4350 may determine the location information value as a 4-bit ($2^4$ bits=16 bits) value. However, as the number of bits assigned to the location information value is increased, a quality of a pattern image to be watermarked is deteriorated. Therefore, by assigning less number of bits to the location information value, the amount of bit information for each frame can be reduced. For example, the location information matching unit 4350 may use 2 bits of location information values, and in this case, the 2 bits of location information values (i.e., 00, 01, 10, and 11) can be repeatedly matched with each bit value of the second tracking information four times ($2^2$ bits×4=16 bits).

Accordingly, in the embodiment of the present invention, the location information value as well as the tracking information is inserted into a pattern image, and the pattern image is watermarked to video data. Therefore, it is possible to prepare for various attacks such as rotation, translation, cropping, scaling, frame rate conversion, and resolution conversion.

In the embodiment of the present invention, it has been explained that the location information matching unit 4350 generates the third tracking information by matching each bit value of the second tracking information with the location information value. However, the present invention is not limited to this embodiment. The location information value may be matched with each bit value of the first tracking information.

Hereinafter, the second tracking information in accordance with an embodiment of the present invention will be described with reference to FIG. 4.

Figure 4:
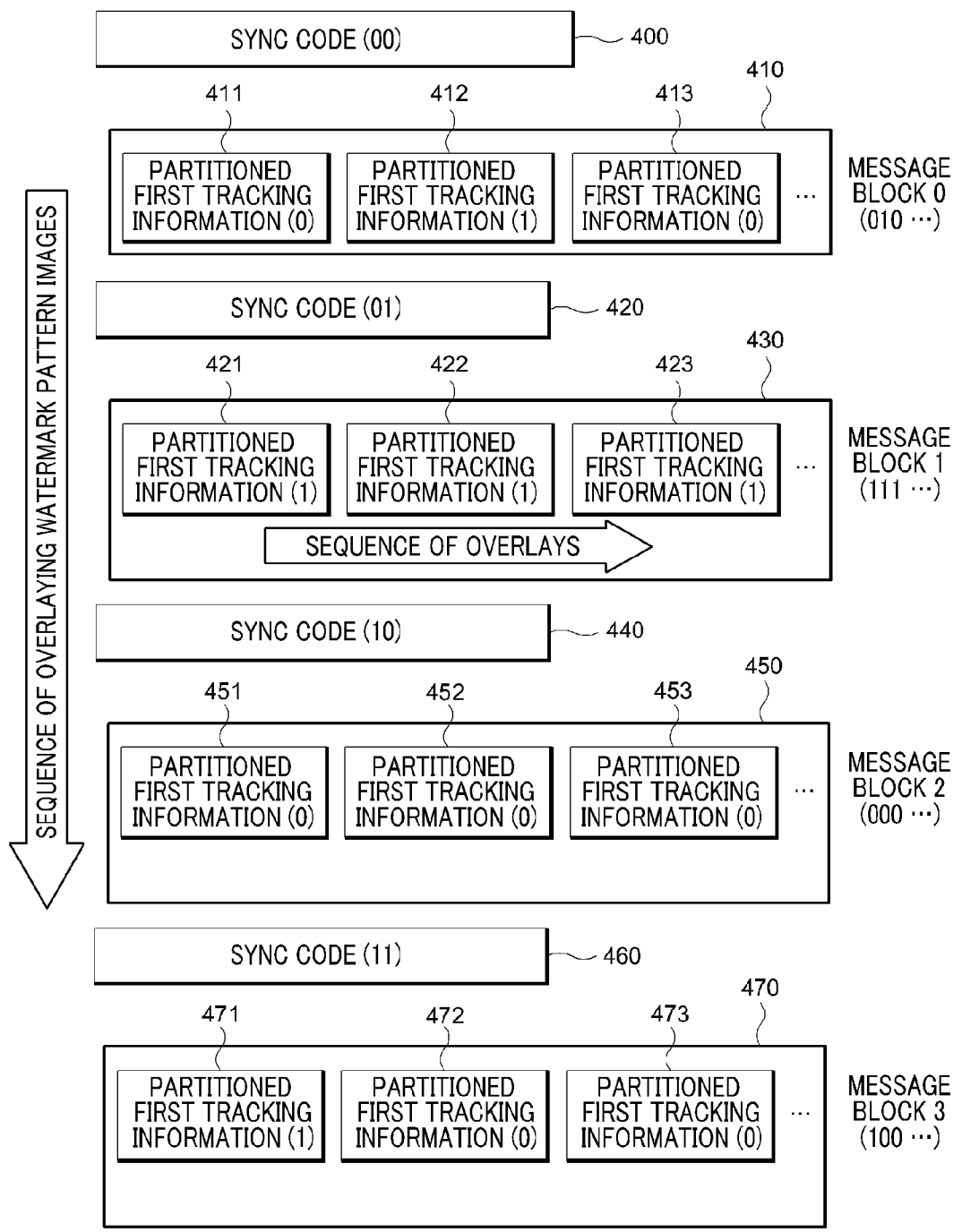
FIG. 4 is a view showing second tracking information in accordance with an embodiment of the present invention.

FIG. 4 is a view showing second tracking information in accordance with an embodiment of the present invention.

As depicted in FIG. 4, the second tracking information in accordance with the embodiment of the present invention may include sync codes 400, 420, 440, and 460, and partitioned first tracking information 411, 412, 413, 421, 422, 423 and so on.

The partitioned first tracking information in the second tracking information can be distinguished by a sync code. Further a pattern image corresponding to the sync code may be distinguishable from a pattern image corresponding to the partitioned first tracking information.

Further, the sync code can be repeatedly inserted between the partitioned first tracking information. For example, a sync code having a group number 00 can be repeatedly inserted before the partitioned first tracking information (or a message block) corresponding to the group number 00.

Hereinafter, the third tracking information matched with the location information value in accordance with an embodiment of the present invention will be described with reference to FIGS. 5 and 6.

Figure 5:
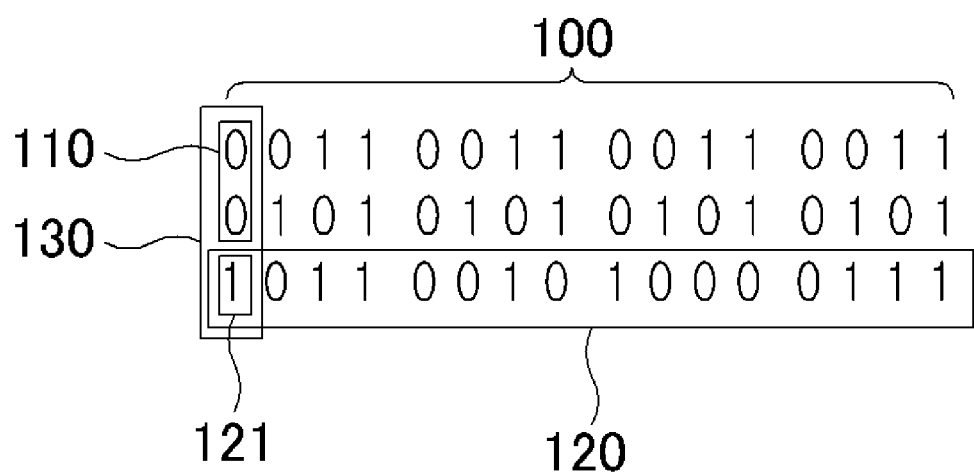

FIGS. 5 and 6 provide examples of third tracking information matched with a location information value in accordance with an embodiment of the present invention.

As depicted in FIG. 5, third tracking information 300 matched with a location information value in accordance with the embodiment of the present invention includes a location information value 110, a second tracking information 120, a bit value 121 of second tracking information 120 and bit information of each frame 130.

Referring to FIG. 5, the location information value 110 may be repeated with four times duration of the location information value (00-11), and each of the location information value 110 may be matched with each bit value of the second tracking information.

Further, as depicted in FIG. 6, the second tracking information 120 has a binary value and can be repeated on a cycle of 16, the total number of bits of the second tracking information 120.

Furthermore, the bit information of each frame 130 includes the location information value 110 and the bit value 121 of the second tracking information 120. The bit information of each frame 130 can be overlaid with a video frame while being included in one pattern image.

In FIG. 5, it has been illustrated that the location information value is matched with the bit value of the second tracking information, but the present invention is not limited thereto. The location information value can be matched with a bit value of the first tracking information.

Moreover, the location information value can be matched with multiple bit values of the second tracking information (for example, the location information value can be matched with a sync code and a message block which will be described later), and in this case, the bit value of each frame may include the multiple bit values of the second tracking information and the location information values matched therewith.

Hereinafter, an illegal distribution tracking system 5000 in accordance with an embodiment of the present invention will be described with reference to FIG. 7.

Figure 7:
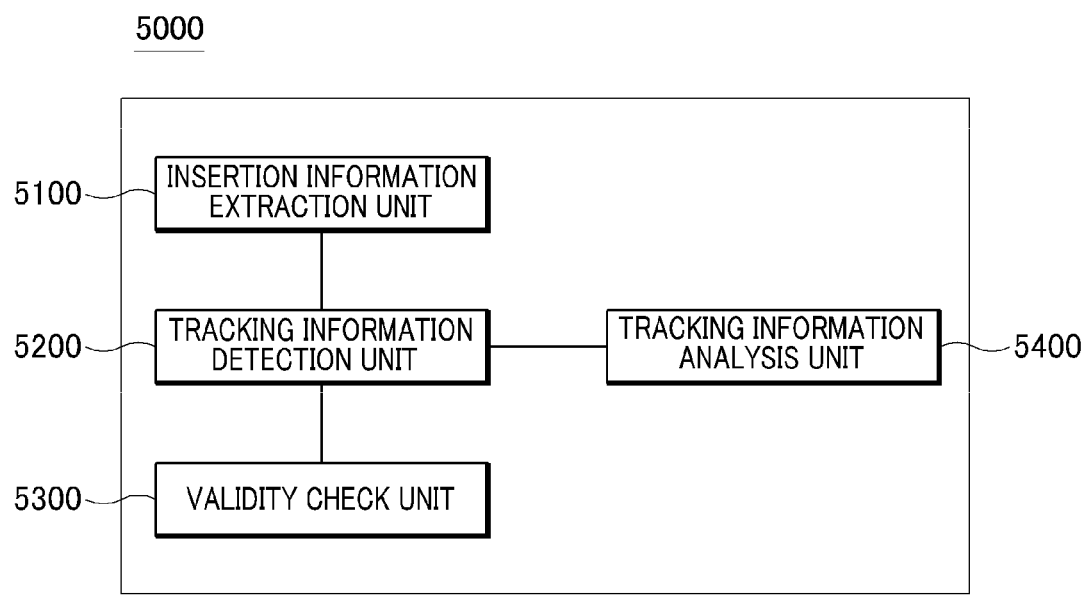
FIG. 7 is a detailed configuration view of an illegal distribution tracking system in accordance with an embodiment of the present invention.

FIG. 7 is a detailed configuration view of an illegal distribution tracking system 5000 in accordance with an embodiment of the present invention.

As depicted in FIG. 7, the illegal distribution tracking system 5000 in accordance with the embodiment of the present invention includes an insertion information extraction unit 5100, a tracking information detection unit 5200, a validity check unit 5300, and a tracking information analysis unit 5400.

The insertion information extraction unit 5100 is configured to extract inserted watermark information from a video. The insertion information extraction unit 5100 may extract bit information of each frame from video data and combine it so as to complete watermark information (for example, third tracking information matched with location information). If the third tracking information is repeatedly overlaid with the video data, the insertion information extraction unit 5100 can extract the third tracking information repeatedly. Further, the insertion information extraction unit 5100 may compare and modify the repeatedly extracted third tracking information so as to finally fix the third tracking information.

The insertion information extraction unit 5100 may determine whether or not the bit information of each frame extracted from the video data is valid based on location information, and if not, the insertion information extraction unit 5100 may modify the bit information of each frame and complete the third tracking information.

For example, if location information value included in the extracted bit information of each frame and location information value included in the subsequently extracted bit information of each frame are not consecutive values, the insertion information extraction unit 5100 may determine that the subsequently extracted bit information value of each frame is not valid. Further, the insertion information extraction unit 5100 may generate the third tracking information without the subsequently extracted bit information of each frame and make location in the third tracking information corresponding to the subsequently extracted bit information of each frame be empty.

Further, for example, if location information value included in the extracted bit information of each frame and location information value included in the subsequently extracted bit information of each frame are identical with each other, the insertion information extraction unit 5100 may determine that the subsequently extracted bit information value of each frame is not valid and may provide the third tracking information in disregard of the subsequently extracted bit information of each frame.

The insertion information extraction unit 5100 may compare and modify the third tracking information provided as stated above.

The tracking information detection unit 5200 is configured to detect second tracking information from the third tracking information. The tracking information detection unit 5200 may detect the second tracking information based on location information value of the repeated third tracking information and the total number of bits of the second tracking information. For example, the tracking information detection unit 5200 may detect bit information of each frame as many as the number of bits of the second tracking information at a location having a location information value of '00'.

The validity check unit 5300 is configured to determine whether or not the second tracking information detected by the tracking information detection unit 5200 is valid, and if not, the validity check unit 5300 may change a detection location. A pattern image can be inserted into the video data, and in this case, the tracking information detection unit 5200 may not identify a starting location of the second tracking information in the third tracking information. Therefore, it is necessary to detect the second tracking information by changing the detection location of the tracking information until the detected tracking information is valid or until the starting location of the detected second tracking information has a sync code of '0'.

Further, the validity check unit 5300 may determine whether or not the detected second tracking information is valid by using an error code included in the detected second tracking information.

Furthermore, if the tracking information detected from the location having the location information value of '00' is not valid, the validity check unit 5300 may change such a location into a subsequent location having the location information value of '00'.

The tracking information analysis unit 5400 is configured to detect first tracking information from the detected second tracking information, analyze the first tracking information, and track an illegal distribution of the video data.

The tracking information analysis unit 5400 may distinguish a sync code and a message block from the second tracking information, extract message blocks without any error, and combine them. The tracking information analysis unit 5400 may determine whether or not the sync code is valid, and identify the sync code as a group number of the subsequently extracted message block. Further, in case of extracting the sync code, although the sync code is changed, if value of the location information corresponding to the changed sync code is not consecutive, the tracking information analysis unit 5400 may determine that the changed sync code is not valid.

Furthermore, the tracking information analysis unit 5400 may identify a group number of the message block based on the extracted sync code, determine whether or not each message block is valid, extract only the valid message blocks, and combine them in a sequence of group numbers. The tracking information analysis unit 5400 may extract a message block without any error by group number and completes the whole message block. Further, the tracking information analysis unit 5400 may detect the first tracking information from the complete message block.

Accordingly, even if part of message blocks including a partitioned tracking information has an error, the rest of the message block without any error can be used, and, thus, it is possible to more effectively detect the first tracking information.

Hereinafter, a method of generating third tracking information in accordance with an embodiment of the present invention will be described with reference to FIG. 8. Although it has been illustrated in FIG. 8 that third tracking information to be watermarked into a video is generated by matching second tracking information with a location information value, the present invention is not limited thereto. The third tracking information to be watermarked may be generated by matching first tracking information with the location information value.

Figure 8:
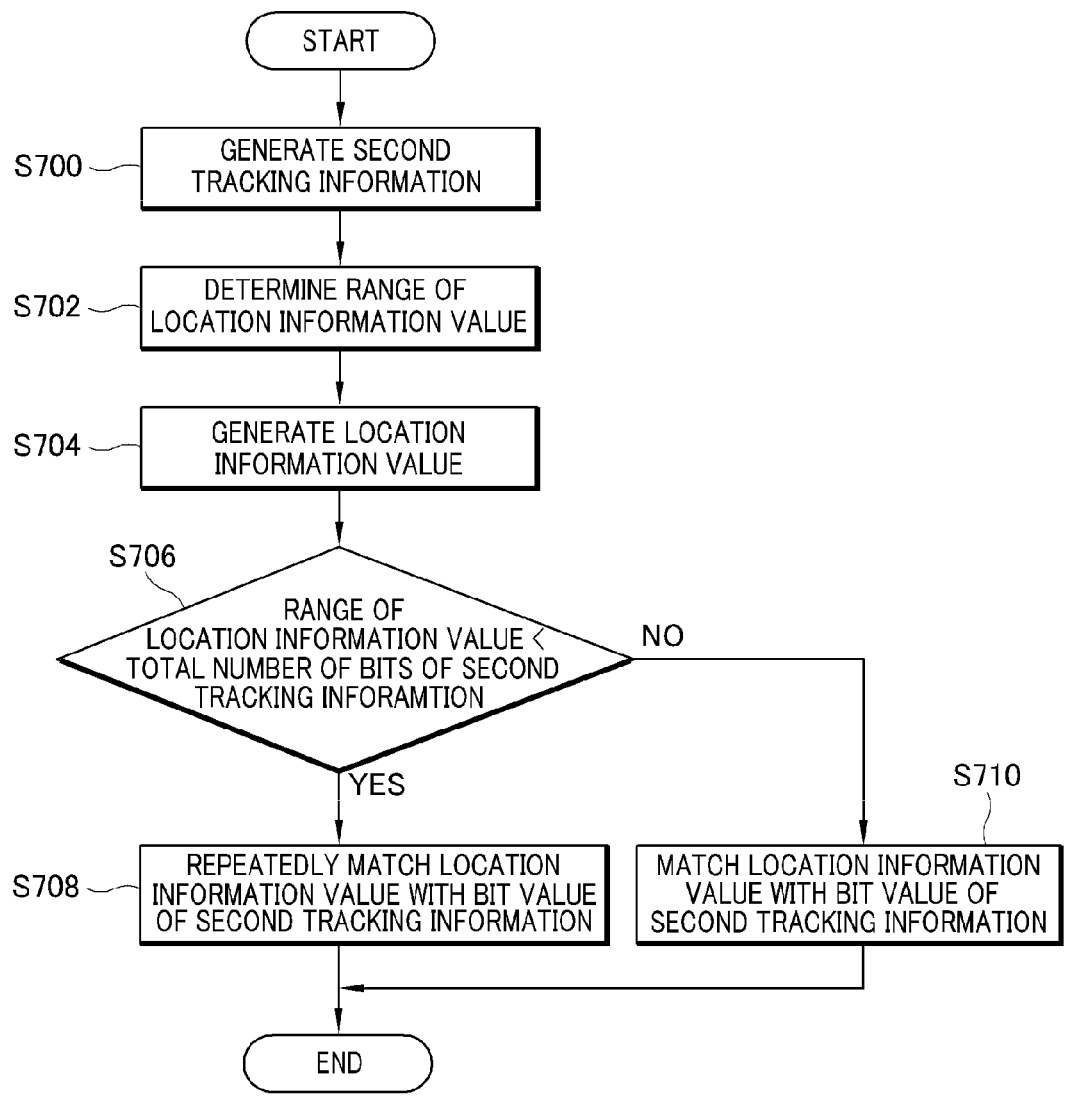
FIG. 8 is a flowchart showing a method of generating third tracking information in accordance with an embodiment of the present invention.

FIG. 8 is a flowchart showing a method of generating third tracking information in accordance with an embodiment of the present invention.

In step S700, second tracking information to be used for tracking an illegal distribution is generated. The second tracking information may be generated by encoding first tracking information. The second tracking information may include first tracking information and sync codes which are inserted between partitioned first tracking information. The second tracking information may further include an error correction code. Further, in step S700, the second tracking information can be generated as illustrated in FIG. 4.

Then, in step S702, a range of a location information value is determined, and in step S704, the location information value is generated.

In step S706, it is determined whether or not the range of the location information value is smaller than the total number of bits of tracking information.

If so, the location information value is repeatedly matched with a bit value of the second tracking information on a cycle of the range of the location information value (step S708).

If not, the location information value is matched with the bit value of the second tracking information (step S710).

Hereinafter, a method of inserting a watermark pattern image in a user terminal 4000 in accordance with an embodiment of the present invention will be described with reference to FIG. 9.

Figure 9:
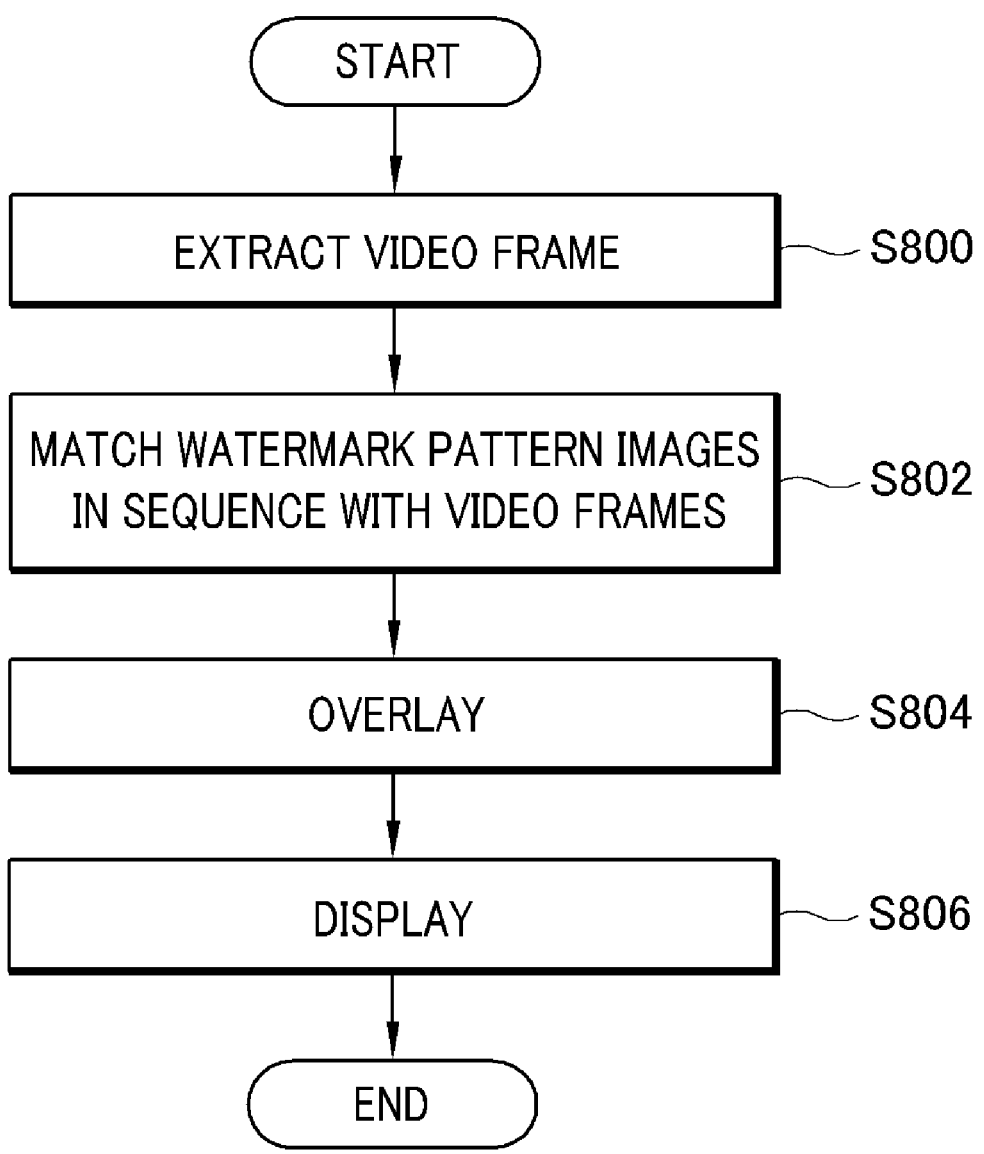
FIG. 9 is a flowchart showing a method of inserting a watermark pattern image in a user terminal in accordance with an embodiment of the present invention.

FIG. 9 is a flowchart showing a method of inserting a watermark pattern image in a user terminal 4000 in accordance with an embodiment of the present invention.

First of all, the frame extraction unit 4100 extracts a video frame by decompressing a stream of video data (step S800).

Then, the watermark insertion unit 4400 matches watermark pattern images in sequence with video frames based on location information values (step S802), and overlays the matched watermark pattern image with the video frame (step S804). The watermark insertion unit 4400 may call pattern images including bit information of each frame and overlay the called pattern images in sequence with the video frames. Further, the watermark insertion unit 4400 may repeatedly overlay watermark images with video data by frame on a cycle of the number of bits of the tracking information.

Thereafter, the display unit 4500 displays the overlaid video data (step S806).

Hereinafter, a method of tracking an illegal distribution of a video in accordance with an embodiment of the present invention will be described with reference to FIG. 10. Although it has been illustrated in FIG. 10 that watermark information is third tracking information, the present invention is not limited thereto.

Figure 10:
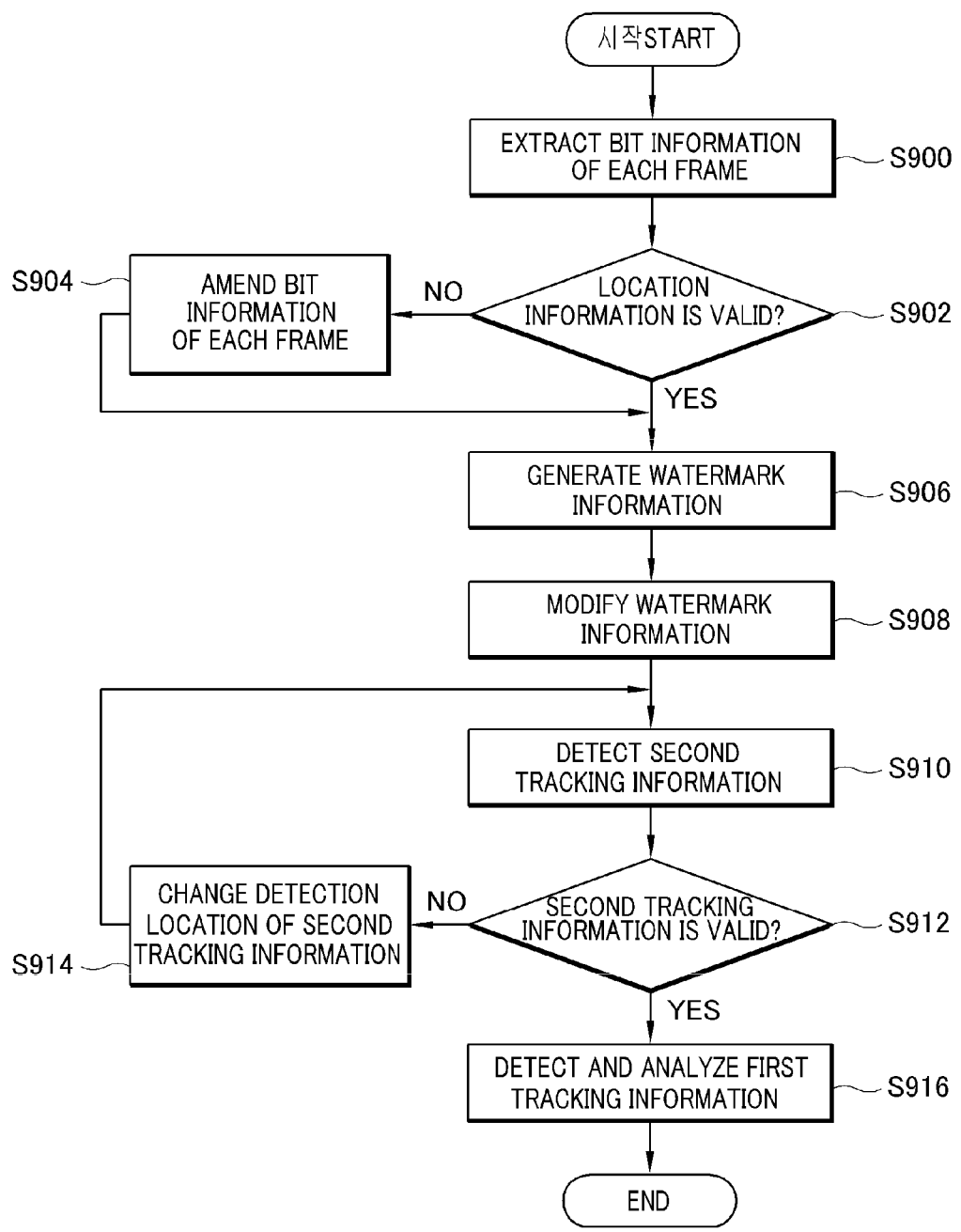
FIG. 10 is a flowchart showing a method of tracking an illegal distribution of a video in accordance with an embodiment of the present invention.

FIG. 10 is a flowchart showing a method of tracking an illegal distribution of a video in accordance with an embodiment of the present invention.

First of all, the insertion information extraction unit 5100 extracts bit information of each frame from an illegally distributed video (step S900), and determines whether or not the extracted bit information of each frame is valid (step S902).

If so, the watermark information is generated (step S906), and if not, the bit information of each frame is amended (step S904) and then the watermark information is generated (step S906). The watermark information may be repeatedly generated. If the bit information of each frame is not valid, the insertion information extraction unit 5100 may generate the watermark information in disregard of the bit information of each frame or with absence of the bit information of each frame. Further, the insertion information extraction unit 5100 may repeatedly generate the watermark information on a cycle of the number of bits of second tracking information.

Then, by comparing the repeated watermark information, the absent part of the watermark information is modified, thereby completing the watermark information (step S908).

Thereafter, the tracking information detection unit 5200 detects the second tracking information from the watermark information (step S910). The tracking information detection unit 5200 may detect the second tracking information based on a location information value and the total number of bits of the second tracking information.

Subsequently, the validity check unit 5300 determines whether or not the detected second tracking information is valid (step S912).

If not, the validity check unit 5300 changes a detection location of the second tracking information (step S914) and the tracking information detection unit 5200 detects the second tracking information at the changed location (step S910).

If so, the tracking information analysis unit 5400 detects first tracking information from the detected second tracking information and identifies an illegal distribution of video data by analyzing the detected first tracking information (step S916).

Hereinafter, a procedure of modifying watermark information in accordance with an embodiment of the present invention will be described with reference to FIGS. 11 and 12.

FIGS. 11 and 12 show watermark information before and after modification in accordance with an embodiment of the present invention.

In the watermark information before modification, there exists empty bit information of each frame. Since the repeated watermark information should have the same value, bit values to be included in the empty bit information of each frame can be found by comparing the watermark information. Therefore, the insertion information extraction unit 5100 may complete the watermark information by comparing the watermark information and finding the bit values to be included in the empty bit information of each frame.

Further, watermark pattern images are overlaid in sequence with video data by frame based on location information value, and a watermark pattern image into which the same bit information of frame is inserted may be repeatedly and consecutively overlaid with the video data. In this case, if the same bit information of each frame is consecutively repeated several times and there exists the empty bit information of each frame (not illustrated), it is possible to complete the watermark information by finding valid values of the empty bit information of each frame by comparing the consecutively repeated bit information of each frame. Further, in this case, location information of the consecutively repeated bit information of each frame may be used.

Hereinafter, a procedure of detecting second tracking information in accordance with an embodiment of the present invention will be described with reference to FIGS. 13 to 15.

Figure 14:
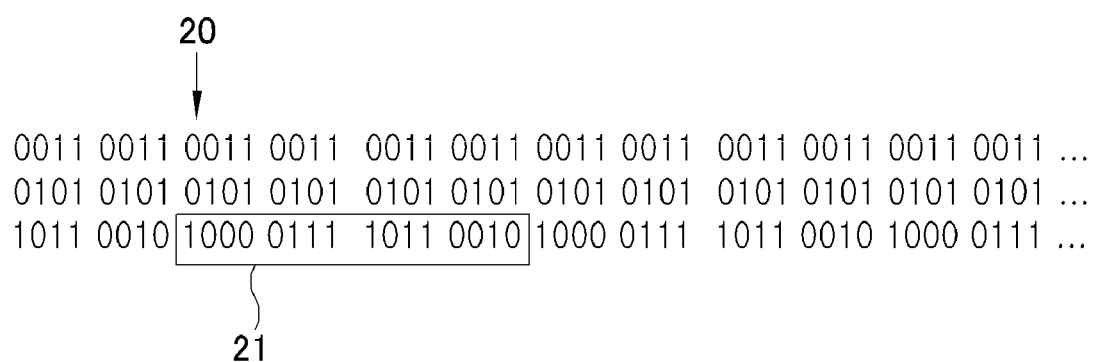
Figure 15:
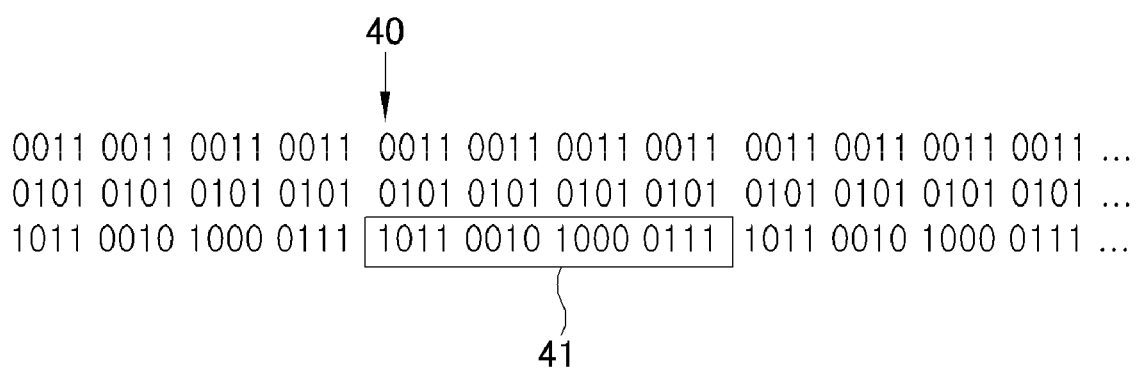

FIGS. 13 to 15 show a procedure of detecting second tracking information in accordance with an embodiment of the present invention.

First of all, if second tracking information 11 detected at a specific location 10 is not valid, a detection location of the second tracking information is changed.

If second tracking information 21 detected at a changed detection location 20 is not valid, a detection location of the second tracking information is changed again.

In this case, the detection location of the second tracking information is changed to a location corresponding to a location information value of '00'.

The detection location of the second tracking information is continuously changed until the second tracking information is valid.

In the end, the tracking information detection unit 5200 may detect valid second tracking information 41 at a specific location 40.

Hereinafter, a method of detecting first tracking information from second tracking information in accordance with an embodiment of the present invention will be described with reference to FIG. 16.

Figure 16:
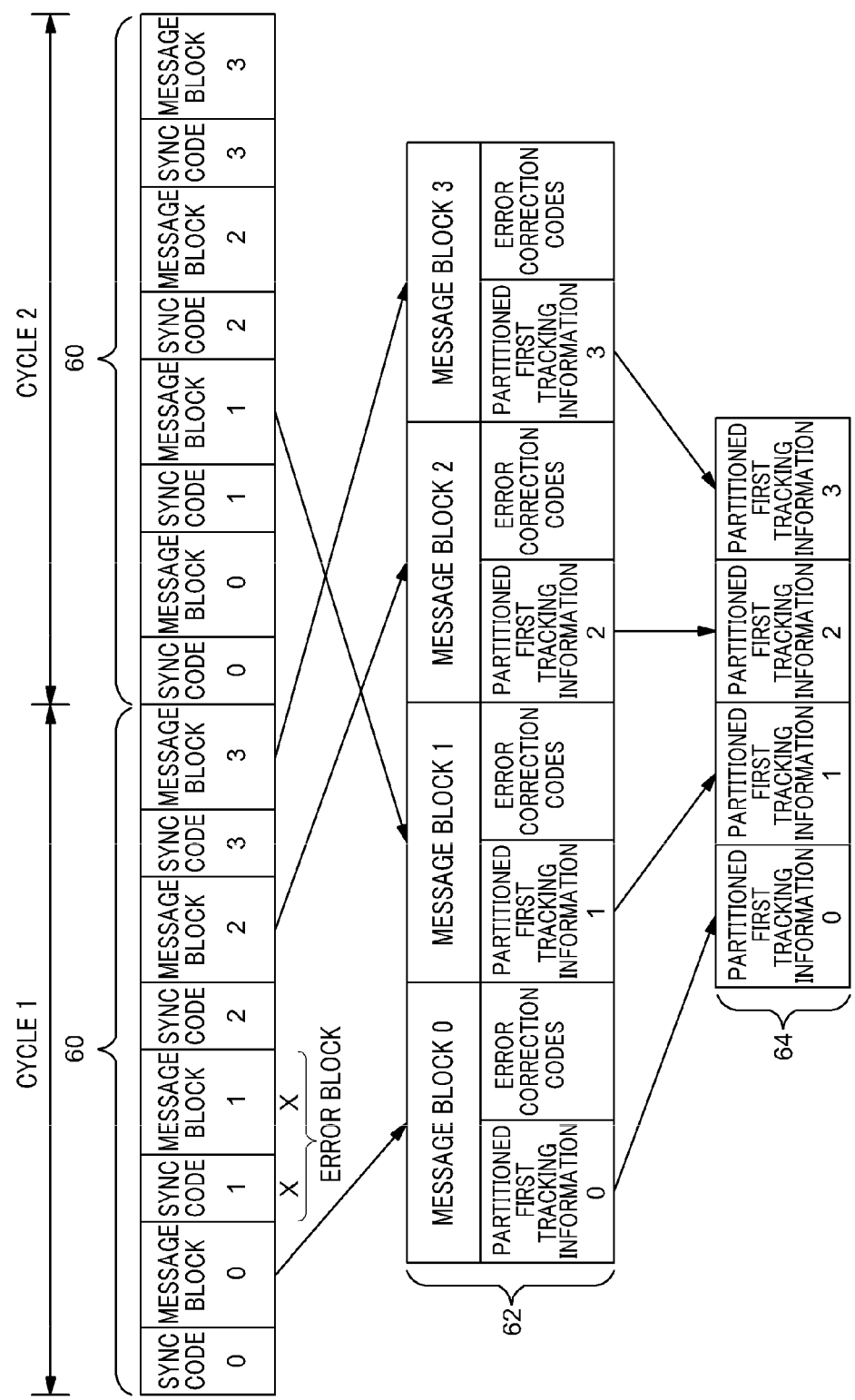
FIG. 16 is a view showing a method of detecting first tracking information from the second tracking information in accordance with an embodiment of the present invention.

FIG. 16 is a view showing a method of detecting first tracking information from second tracking information in accordance with an embodiment of the present invention.

As depicted in FIG. 16, second tracking information 60 may be repeatedly detected on a specific cycle, and the second tracking information 60 may include multiple sync codes and message blocks. Each of the sync codes may have a group number of each message block and be positioned between two message blocks so as to distinguish the multiple message blocks from one another.

Accordingly, the message blocks can be distinguished from one another by the sync codes, and each of the message blocks can be extracted and the extracted message blocks can be arranged in a sequence of group numbers as shown with, for example, ID 62. If a message block 1 of the second tracking information 60 during a cycle 1 has any error, message blocks 0, 2 and 3 may be extracted from the second tracking information during the cycle 1 and a message block may be extracted from the second tracking information during a cycle 2. Further, the extracted message blocks are arranged in group numbers so as to complete the whole message block 62.

Each of the message blocks may include partitioned first tracking information value and an error correction code. Further, first tracking information 64 can be completed by extracting only the partitioned first tracking information value without error correction codes from the whole message block 62.

The embodiment of the present invention can be embodied in a storage medium including instruction codes executable by a computer such as a program module executed by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. For example, each component described to be of a single type can be implemented in a distributed manner. Likewise, components described to be distributed can be implemented in a combined manner.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. An apparatus for inserting a watermark comprising:
   a watermark pattern image receiving unit that stores a watermark pattern image corresponding to a preset binary value;
   a watermark information generation unit that stores watermark information including binary tracking information generated based on a user ID value or a terminal ID value; and
   a watermark insertion unit that receives watermark pattern images corresponding to bit values of the stored watermark information from the watermark pattern image generation unit, and overlays the watermark pattern images in sequence on a display screen, wherein the watermark information generation unit generates the watermark information by matching a location information value indicating a location of a bit value of the binary tracking information with the bit value of the binary tracking information, and wherein the watermark information generation unit generates the watermark information by partitioning the tracking information, adding a group number for identifying the partitioned tracking information between the partitioned tracking information, and matching the location information value with a bit value of the tracking information to which the group number is added.

2. The apparatus for inserting the watermark of claim 1, wherein the watermark pattern image receiving unit receives the watermark pattern image from a server and stores it.

3. The apparatus for inserting the watermark of claim 1, wherein the watermark information generation unit generates the watermark information by matching the location information value with multiple bit values of the tracking information, and the watermark insertion unit overlays a watermark pattern image corresponding to the matched location information value and the matched multiple bit values.

4. The apparatus for inserting the watermark of claim 1, wherein the watermark insertion unit repeatedly inserts the generated watermark information into video data.

5. The apparatus for inserting the watermark of claim 1, wherein the watermark pattern image is generated by inserting the preset bit value to a logo image.

6. A method of inserting a watermark comprising:
receiving a watermark pattern image corresponding to a predetermined binary value;
generating watermark information including binary tracking information with respect to a user reproducing video data;
receiving watermark pattern images each corresponding to a bit value of the generated watermark information based on the generated watermark information; and
overlaying the received watermark pattern images in sequence with frames of the video data,
wherein in the step of generating the watermark information, the watermark information is generated by matching a location information value indicating a location of a bit value of the binary tracking information with the bit value of the binary tracking information, and
wherein in the step of generating the watermark information, the watermark information is generated by partitioning the tracking information, inserting a group number for identifying the partitioned tracking information between the partitioned tracking information, and matching the location information value with a bit value of the tracking information into which the group number is inserted.

7. The method of inserting the watermark of claim 6, wherein in the step of generating the watermark information, the watermark information is generated by matching the location information value with each of multiple bit values of the tracking information, and in the step of receiving the watermark pattern image, a watermark pattern image corresponding to the matched location information value and the matched multiple bit values are received.

8. The method of inserting the watermark of claim 6, wherein in the step of overlaying, the generated watermark information is repeatedly inserted into the video data.

9. The method of inserting the watermark of claim 6, wherein the watermark pattern image is generated by inserting the preset number of bit value to a logo image.

10. The method of inserting the watermark of claim 6, further comprising:
receiving a rule of generating the watermark information and a rule of overlaying the watermark pattern image, from a server.

11. A system for detecting watermarked tracking information comprising:
an insertion information extraction unit that generates watermark information by extracting bit information of each frame including a bit value of tracking information and a location information value corresponding to the bit value of the tracking information, from a watermark pattern image overlaid with each frame of video data, and by arranging the extracted bit information of each frame;
a tracking information detection unit that detects the tracking information from a repeated specific sequence of bits based on the generated watermark information and the location information; and
a tracking information analysis unit that identifies an illegal distribution of content based on the detected tracking information,
wherein the tracking information includes information for identifying a user terminal reproducing the video data, and
wherein the tracking information includes partitioned information for identifying the user terminal and group numbers corresponding to the partitioned information between the partitioned information, and the tracking information analysis unit combines the partitioned information between the group numbers in sequence.

12. The system for detecting the watermarked tracking information of claim 11, further comprising:
a validity check unit that determines whether or not the detected tracking information is valid,
wherein if the detected tracking information is not valid, the tracking information detection unit changes a detection location of the tracking information and detects the tracking information from the changed detection location.

13. The system for detecting the watermarked tracking information of claim 11, wherein if the location information value included in the extracted bit information of each frame is not valid, the insertion information extraction unit generates the watermark information by modifying the invalid bit information of each frame.

14. The system for detecting the watermarked tracking information of claim 11, wherein the insertion information extraction unit extracts the bit information of each frame in sequence of the location information values, and if the location information value of the extracted bit information of each frame is not valid, the watermark information is repeatedly generated without the bit information of each frame including the invalid location information.

15. The system for detecting the watermarked tracking information of claim 11, wherein the insertion information extraction unit extracts the bit information of each frame in sequence of the location information values, and if the location information values of the extracted bit information of each frame are continuously identical with each other, the watermark information is repeatedly generated in disregard of the extracted bit information of each frame.

16. The system for detecting the watermarked tracking information of claim 14 or claim 15, wherein the insertion information extraction unit generates the watermark information repeatedly and compares the repeatedly generated watermark information with each other so as to modify the watermark information.

17. An apparatus for inserting a watermark comprising:
  a watermark information generation unit that generates a watermark information including binary tracking information based on a user ID value or a terminal ID value;
  a frame extraction unit that receives video data from a server and extracts video frames from the received video data; and
  a watermark information insertion unit that inserts the generated watermark information in sequence into the extracted video frames,
  wherein the watermark information generation unit generates the watermark information by matching a location information value indicating a location of a bit value of the binary tracking information with the bit value of the binary tracking information, and
  wherein the watermark information generation unit generates the watermark information by partitioning the tracking information, adding a group number for identifying the partitioned tracking information between the partitioned tracking information, and matching the location information value with a bit value of the tracking information to which the group number is added.

* * * * *